US005575931A

United States Patent [19]

Stefani

[11] Patent Number: 5,575,931

[45] Date of Patent: Nov. 19, 1996

[54] APPARATUS FOR ENGRAVING ON A RUBBER CYLINDRICAL MATRIX

[75] Inventor: Franco Stefani, Sassuolo, Italy

[73] Assignee: Syfal S.r.l., Sassuolo, Italy

[21] Appl. No.: 331,900

[22] Filed: Oct. 31, 1994

[30] Foreign Application Priority Data

Apr. 12, 1994 [IT] Italy ................................ M094A0051

[51] Int. Cl.[6] ..................................................... B23K 26/14

[52] U.S. Cl. ................................ 219/121.68; 219/121.82; 219/121.84

[58] Field of Search ............................ 219/121.6, 121.67, 219/121.68, 121.69, 121.75, 121.82, 121.84, 121.7; 264/400; 101/401.1, 467, 470, 471, 401.5; 358/297, 299

[56] References Cited

U.S. PATENT DOCUMENTS

| | | | |
|---|---|---|---|
| 2,574,872 | 11/1951 | Jarvis . | |
| 4,347,785 | 9/1982 | Chase et al. | 219/121.68 |
| 4,358,659 | 11/1982 | Spohnheimer | 219/121.68 |
| 4,566,384 | 1/1986 | Matsumoto | 101/170 |
| 5,126,531 | 6/1992 | Majima et al. | 219/121.68 |
| 5,427,026 | 6/1995 | Kuwahara | 101/401.1 |
| 5,493,095 | 2/1996 | Bruschi et al. | 219/121.75 |

FOREIGN PATENT DOCUMENTS

| | | | |
|---|---|---|---|
| 0421712 | 4/1991 | European Pat. Off. . | |
| 52-69091 | 6/1977 | Japan | 219/121.68 |
| 61-16986 | 7/1986 | Japan | 219/121.84 |
| 63-101088 | 5/1988 | Japan | 219/121.84 |
| 2-258188 | 10/1990 | Japan | 219/121.6 |
| 2048785 | 12/1980 | United Kingdom . | |
| 9323253 | 11/1993 | WIPO . | |

OTHER PUBLICATIONS

Laser Focus, Jul. 1977, pp. 66–68, Doxey B. C., "How a laser system engraves cylinders for printing by the flexography process".

*Primary Examiner*—Teresa J. Walberg
*Assistant Examiner*—Gregory L. Mills
*Attorney, Agent, or Firm*—Browdy and Neimark

[57] ABSTRACT

The apparatus comprises a motor head provided with a chuck on which a matrix-bearing cylinder having a smooth external cylindrical rubber surface can be mounted. An engraving head comprises a laser beam predisposed perpendicularly to the external cylindrical surface of the cylinder.

7 Claims, 3 Drawing Sheets

APPARATUS FOR ENGRAVING ON A RUBBER CYLINDRICAL MATRIX

BACKGROUND OF THE INVENTION.

Specifically but not exclusively the apparatus of the invention is useful for realising, by means of engraving, matrices on matrix-bearing cylinders, provided with at least one external peripheral part which is elastically deformable, used in decoration and glazing of ceramic tiles.

Particular reference is made to matrices engraved on smooth cylindrical surfaces made in silicone rubber, which are constituted by patterns composed of a plurality of microscopic cavities predisposed to house small quantities of glaze.

The cavities, usually distributed over all of the cylindrical surface, can be of various sizes and thus can contain various quantities of glaze. This possibility of variety has the aim of enabling various quantities of glaze to be transferred on to the tiles, in order to obtain a good half-tone quality thereon.

Flexographic cylinders are already well known wherein lasers are employed to engrave on the elastic surface. The most common alternative to the above is the photoengravure technique.

Engravure on a flexographic cylinder, including techniques employing the use of a laser, is effected by removing material from the cylinder surface such as to leave a relief pattern on said surface, which protruding pattern therefore constitutes the active surfaces for the transfer of the ink or the glaze on the support to be printed on.

The above-illustrated prior art therefore engraves on the material, removing it, thus constructing a pattern to be printed or reproduced. It is therefore unsuitable for the reticulation technique necessary for the creation of half-tones.

SUMMARY OF THE INVENTION.

The present invention, as it is characterised in the claims that follow, obviates the above-mentioned drawbacks by providing a versatile apparatus able to realise a matrix constructed in points and with a high degree of resolution.

One advantage of the present invention is that it can be totally automatised, thus permitting an automatic and direct reproduction of patterns by CAD—CAM techniques.

BRIEF DESCRIPTION OF THE DRAWINGS.

Further characteristics and advantages of the present invention will better emerge from the detailed description that follows, of an embodiment of the invention, illustrated in the form of a non-limiting example in the accompanying drawings, in which.

DESCRIPTION of the PREFERRED EMBODIMENTS.

Figure 1:
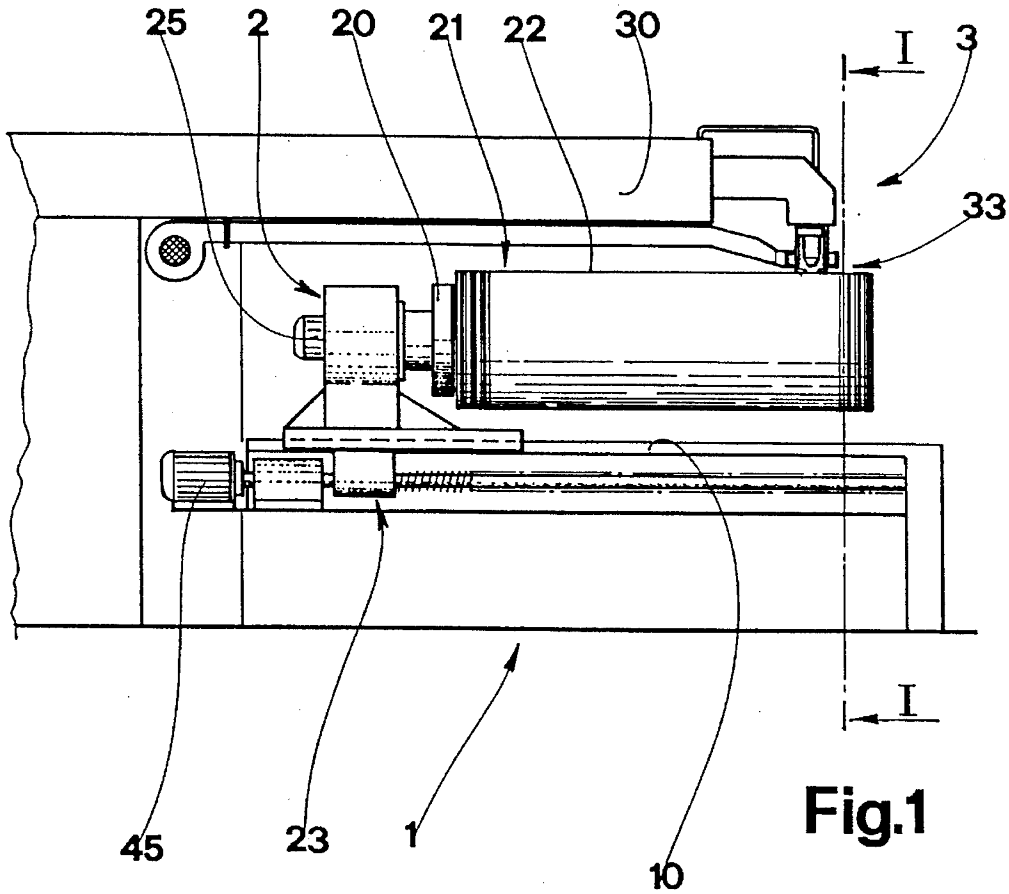
FIG. 1 is a schematic vertical-elevation frontal plan view.
Figure 2:
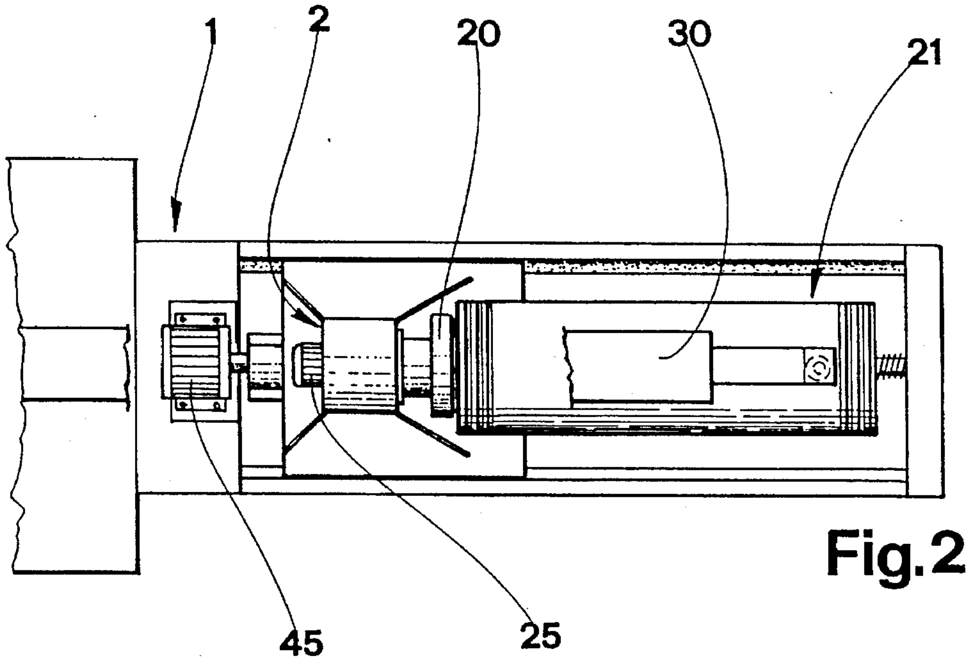
FIG. 2 is a schematic plan view from above of FIG. 1.

With reference to the FIG. 1 denotes in its entirety a frame provided with straight horizontal guides 10 on which a motor head 2 is coupled. The motor head 2 is provided with a chuck 20 rotatingly mobile about an axis which is parallel to the slding direction along the guides 10.

The chuck 20 is equipped and predisposed such that a special matrix-bearing cylinder 21 can be mounted to it, said cylinder 21 exhibiting a smooth elastically-deformable cylindrical surface 22.

The matrix-bearing cylinder 21 comprises an external layer made in silicon rubber and covered by the smooth cylindrical surface 22, which latter constitutes the cylindrical "printing" surface, destined to come into contact with the tile or the like, and which is therefore the surface on which the engraving process takes place.

The chuck 20 and thus the cylinder 21 solid thereto are set in rotation about their axis by a motor 25, controlled by a driver 15. The entire motor head 2 is mobile along the guides 10, driven by a worm-worm wheel gearing 23 activated by a motor 45 commanded by a driver 35.

The apparatus is thus controlled on two axes—the rotation of the chuck 20 and the translation of the motor head 2—controlled by an axis control unit 5 commanding the two drivers 15 and 35. These relate to a means for controlling rotation of the chuck and translation of the motor head long the guides. The above-described system enables the cylinder 21 to be positioned at any single point with respect to a fixed point, and with a high degree of precision.

An engraving head 3 is arranged on the frame 1, and comprises a source 30 of a laser beam 31 having its axis directed perpendicular and incident with the chuck 20 rotation axis and therefore perpendicular to the smooth cylindrical surface 22 of the cylinder 21. The laser source used in the embodiment of the figure is a $CO_2$ laser with a wavelength of 10.6 micrometers, superpulsed and characterised by a continuous 120 watt potential.

Figure 5:
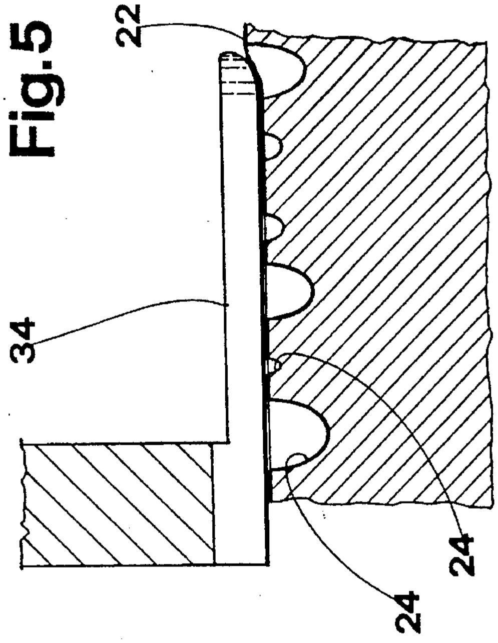
FIG. 5 is an enlarged-scale schematic section made according to line IV—IV of FIG. 4.
Figure 4:
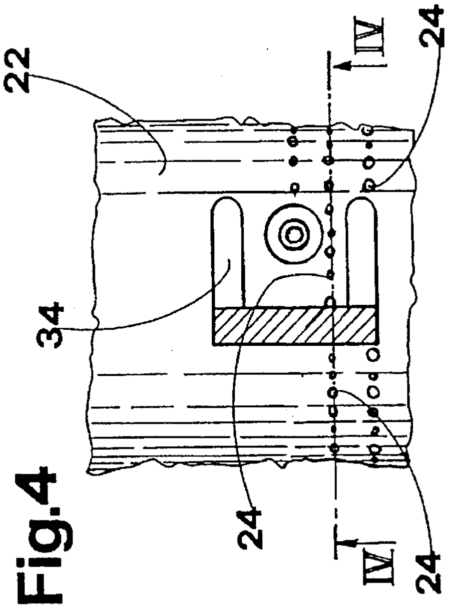
FIG. 4 is a schematic section made according to line III—III of FIG. 3.
Figure 3:
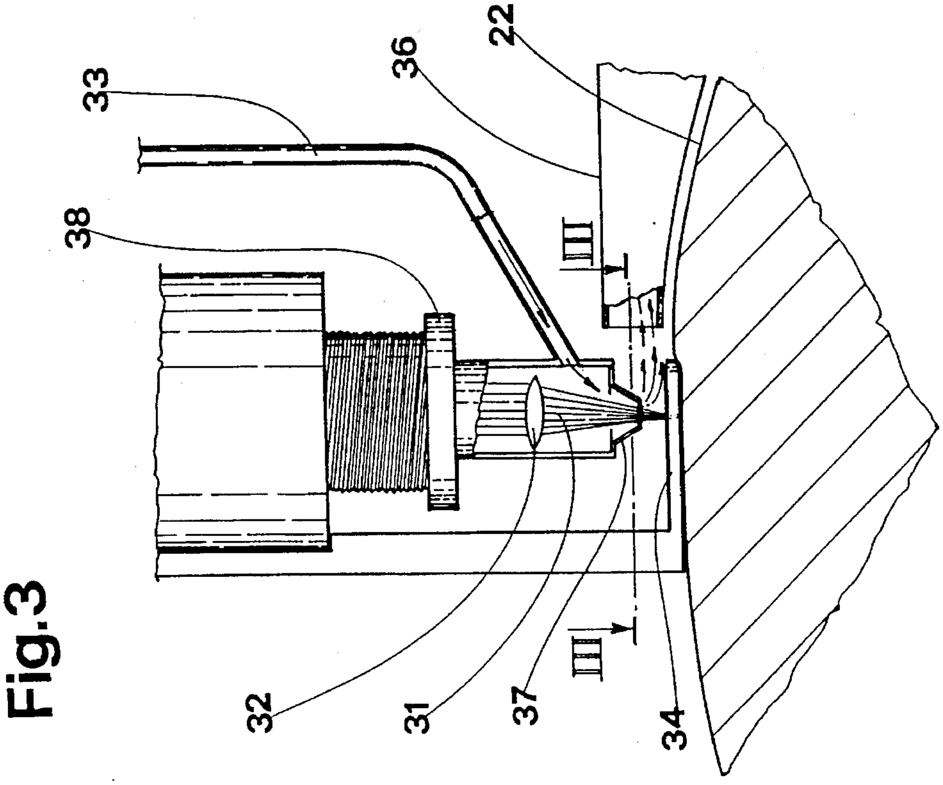
FIG. 3 is an enlarged-scale detail of a schematic section made according to line I—I of FIG. 1.
Figure 6:
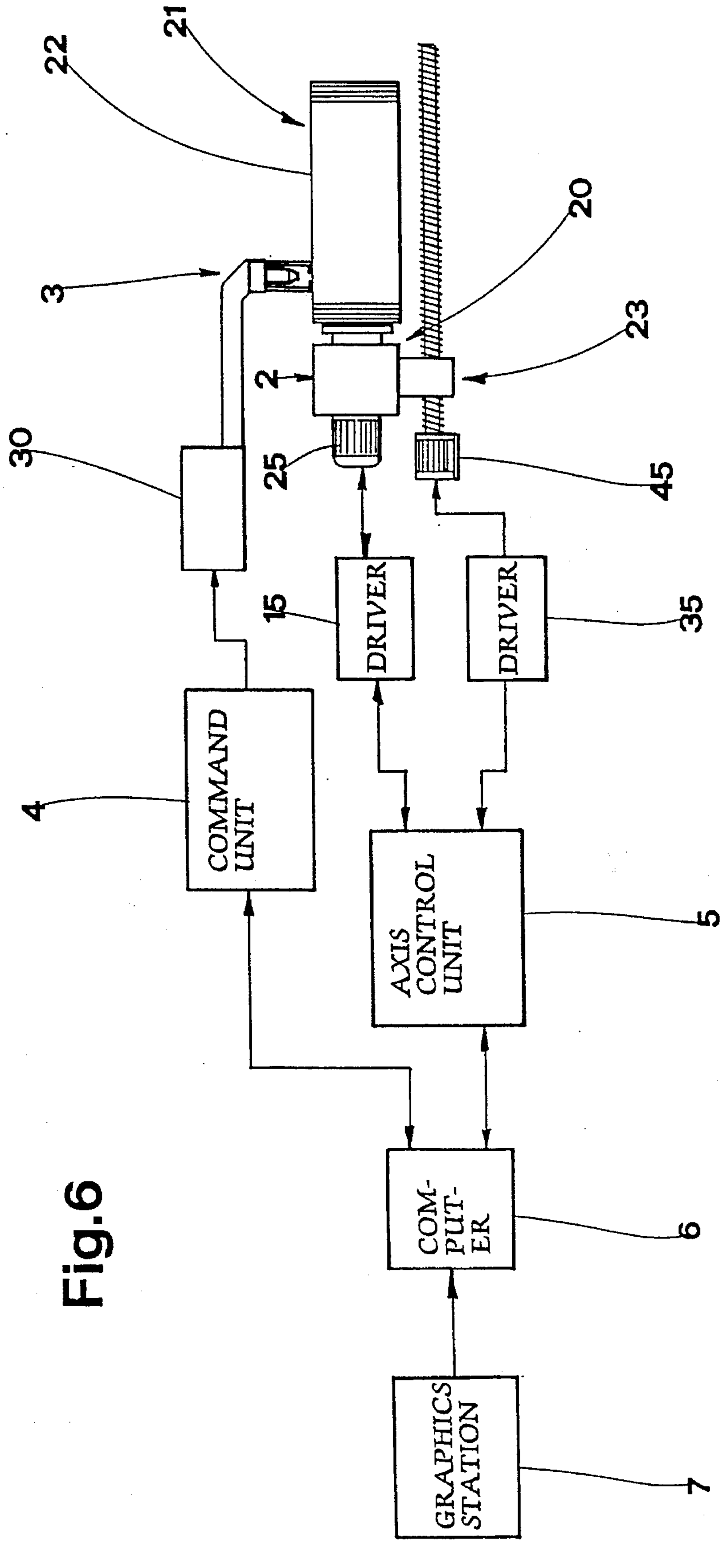
FIG. 6 is a block diagram of the control system of the invention.

The laser beam is focalized by a focalizing device 32 at a prefixed distance from the contact surface of a spacer skate 34, fixed to the head 3 and predisposed to contact draggingly on the external cylindrical surface 22 of the cylinder 21. As is shown in FIGS. 3 and 5, the skate 34 slightly depresses the elastic or rubbery surface 22 of the cylinder 21 as it skates over it. As shown in FIGS. 4 and 5, the skate 34 includes two prongs, each of which has a forward-facing end which is rounded in both the plane tangent to the surface 22 (FIG. 4) and the plane perpendicular to the axis of the cylinder 21 (FIG. 5). The focalizing of the laser beam 31 on the surface 22 is performed by means of a collar 38 enabling the distance between the focalizing device 32 and the skate 34 to be varied. The skate 34 maintains the external cylindrical surface 22 of the cylinder 21 at a preestablished distance from the focalizing device 21.

The laser 30 is controlled by a command unit 4 directly connected, as is the axis control unit 5, to a computer 6. The computer is in turn connected to a graphics station 7 by means of which matrix patterns can be made and memorized.

Through the computerized system, the matrix patterns are analyzed and transformed into a map of uniformly-distributed points or small areas, each of which is characterized by size. Each point on a map corresponds to at least one dosed application of the laser beam 31. The laser beam force is determined by a prefixed combination of the pulse power and duration. The power-duration combination of values is transmitted by the computer 6 to the command unit 4. The laser beam action on the cylindrical surface 22 produces a vaporization or melting of the material in the interested zone, and the exported material is continuously removed by an air or inert gas blower 33 operating at the localizing device 32 position and having the task of keeping the device scrupulously clean. The air or inert gas is channelled parallel to the laser beam 31 and exits from a nozzle 37 in a perpendicular direction to the surface 22. The action of the thus-generated jet facilitates extraction and expulsion of the material removed during the generation of a single cavity 24. An aspirator 36 collects the removed material.

The axis control unit 5 positions the surface area 22 to be shaped below the focalizing device 32. The positioning is executed with great precision and very high resolution: on average the resolution varies from 0.1 to 0.8 millimeters. For each positioning (which does not require stopping the cylinder) the head 3 emits a laser pulse modulated according to the breadth and depth of the cavity 24 to be engraved at that position. The relevant information regarding the variety of breadth and depth of the different cavities is communicated by the computer in accordance with the information contained in the graphics program. By moving the cylinder 21 a map of cavities 24 can be realized, spaced one from another by various distances, for example between 0.1 and 0.8 millimeters and having similar (variable) ranges of depths. In particular, by way of an example, the $C0_2$ laser (with a 10.6 micrometer wavelength), superpulsed at 120 watts (continuous), five thousand cavities per second can be made on the surface 22, each cavity having a diameter of about 0.1 millimeters by a depth of 0.1 millimeters.

What is claimed is:

1. An apparatus for engraving a cylindrical rubber matrix, comprising:

- a frame;
- a motor head bearing a chuck which is rotatingly mobile about an axis;
- a matrix-bearing head, mounted on the chuck and being provided with a smooth rubber or elastically-deformable external cylindrical surface;
- straight guides arranged parallel to a rotation axis of the chuck, the motor head being mounted and translated thereon;
- means for controlling rotation of the chuck and translation of the motor head along the guides;
- at least one engraving head comprising:
  - at least one source of a laser beam having an axis which is perpendicular and incident to the rotation axis of the chuck;
  - a focalizing device of the laser beam;
  - a blower of air or gas, operating at a same position as the focalizing device and including means for cleaning the device and facilitating evacuation of material removed from the cylindrical surface by the action of the laser beam;
  - a spacer skate to draggingly contact the external cylindrical surface placed in proximity to an area of the cylindrical surface struck by the laser beam at a prefixed distance from the focalizing device;
  - a command apparatus including means for commanding a precise positioning of the external cylindrical surface below the focalizing device and activating a command unit of the laser source;
  - said command apparatus including means for reading, analyzing, and transforming a pattern into a map of uniformly distributed points or small areas, each having individual dimensions;
  - at least one programmed application of the laser beam being effected for each dimension of each point or small area; and
  - wherein the skate includes leading edge means for depressing the external cylindrical surface to said prefixed distance from the focalizing device.

2. The apparatus as in claim 1, wherein the means for controlling rotation of the chuck and translation of the motor head along the guides comprises an axis command unit which comprises:

- a driver controlling a first motor producing rotation of the chuck;
- a driver controlling a second motor translating the motor head along the guides by means of a worm-worm wheel gearing.

3. An apparatus as in claim 1, wherein the laser source comprises a $CO_2$ laser generating pulses, each of which pulses is power- and duration-adjustable and provides a quantity of energy in accordance with a depth and diameter of a single cavity to be engraved.

4. An apparatus as in claim 1, wherein a distance between the focalizing device and the skate is constant; a variation in an effect of the laser beam on a single point or small area of the surface being determined by a total energy with which the point or small area is struck thereby.

5. An apparatus as in claim 1, wherein the command apparatus comprises a computer connected to a graphics station.

6. An apparatus as in claim 1, wherein for a single point or small area a prefixed energy supply corresponding to at least one application of the laser beam is determined by a preestablished power-duration combination of a laser pulse.

7. The apparatus according to claim 1, wherein the focalizing device includes:

- a lens; and
- screw thread means for adjusting a focus distance between a bottom of the skate and the lens.

* * * * *